United States Patent [19]

Miller et al.

[11] Patent Number: 4,585,248

[45] Date of Patent: Apr. 29, 1986

[54] ANTI-JACKKNIFE AND STEERING CONTROL SYSTEM

[76] Inventors: Ray Miller; Ann Miller, both of P.O. Box 3286, Butte, Mont. 59701

[21] Appl. No.: 620,253

[22] Filed: Jun. 13, 1984

[51] Int. Cl.$^4$ .............................................. B62D 53/08
[52] U.S. Cl. ................................ 280/432; 280/446 B; 403/116
[58] Field of Search .............. 280/432, 446 B, 423 R, 280/415 R, 415 A, 415 B; 340/52 R; 403/27, 116, 117

[56] References Cited

U.S. PATENT DOCUMENTS

| | | | |
|---|---|---|---|
| 2,400,738 | 5/1946 | Brown | 280/432 |
| 2,454,626 | 11/1948 | Borzell | 280/432 |
| 3,733,090 | 5/1973 | Keller | 280/432 |
| 3,883,160 | 5/1975 | Meyers et al. | 280/432 |
| 3,895,827 | 7/1975 | Padrick | 280/432 |
| 4,341,395 | 7/1982 | Miller et al. | 340/52 R |

Primary Examiner—John J. Love
Assistant Examiner—Charles R. Watts
Attorney, Agent, or Firm—Leonard Bloom

[57] ABSTRACT

An instrumentality for preventing jackknifing of a vehicle commonly referred to as a tractor trailer and a steering control system therefor including a plate disposed on a bottom face of the trailer adjacent the fifth wheel, a housing disposed on a leading edge of the fifth wheel through an anchor plate, the housing including an upwardly extending locking pin adapted to be placed within the opening on the trailer connecting plate, a system for putting the locking pin into and out of engagement with the opening, first and second sensors deployed with the locking pin indicative of the motion of travel within the opening by the locking pin, a control console disposed within the cab of the tractor indicating the status of the locking pin and coupled with an engine speed sensor for denoting slow moving conditions with the locking pin in effect, and an actuator to cause the locking pin to move from a first to a second position as desired within the ready grasp of the driver.

16 Claims, 7 Drawing Figures

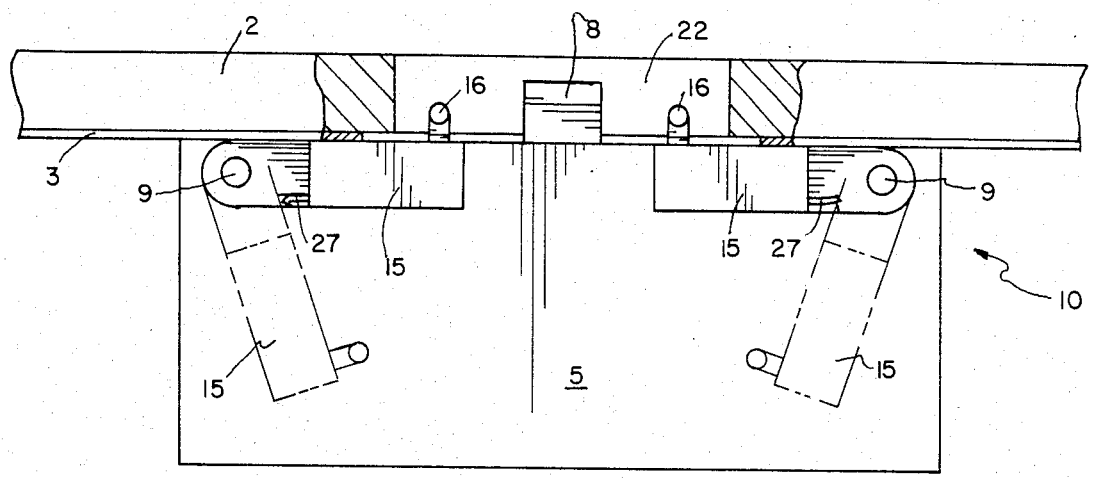
FIG 4
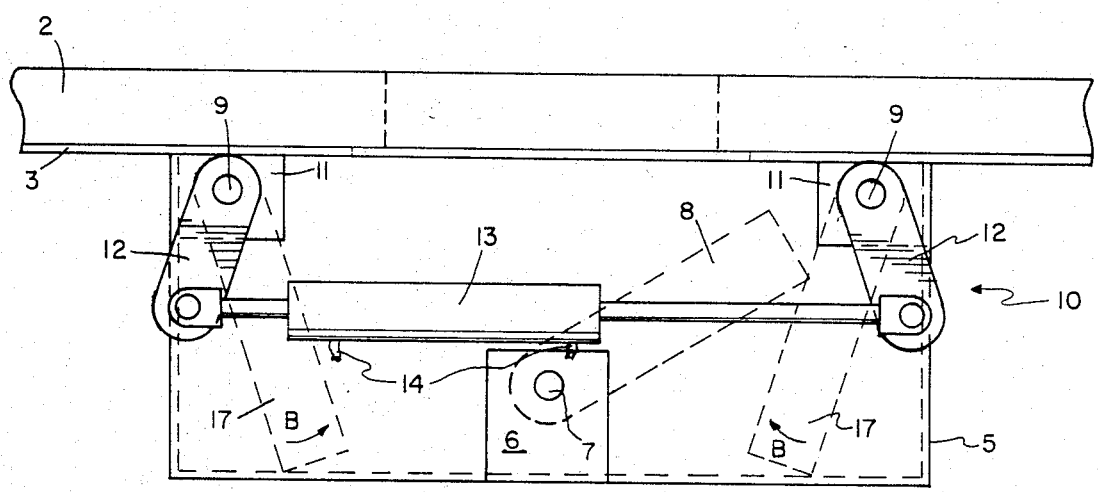
FIG 5
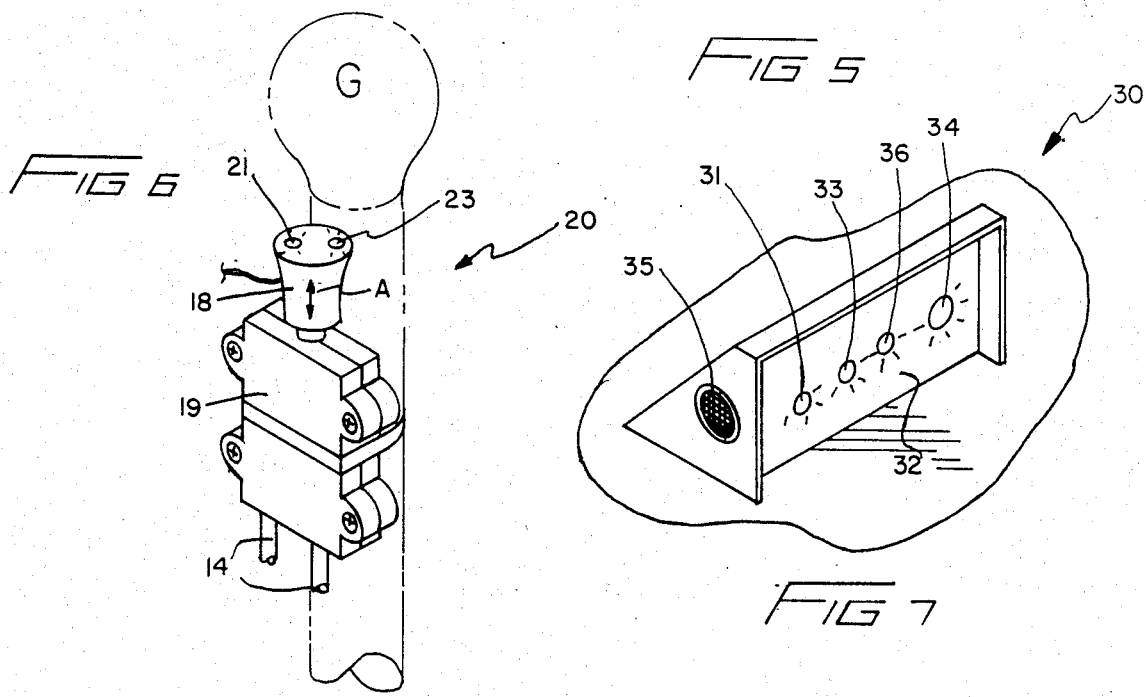
FIG 6
FIG 7

ANTI-JACKKNIFE AND STEERING CONTROL SYSTEM

BACKGROUND OF THE INVENTION

The following relates generally to devices which decrease the possibility of jackknifing in tractor trailer rigs and provides information for improved steering control. More particularly, the following reflects continuing developments over my U.S. Pat. No. 4,341,395 issued July 27, 1982.

The problems and difficulties associated with tractor trailers jackknifing are well documented and need not be belabored here. Suffice to say, loss of property, personal injuries and the like can be averted by having a device on tractor trailers which would reduce the possibility of jackknifing while simultaneously not impairing the ability of the driver to steer and control the rig.

In the earlier patent, a system was provided which allowed first and second pins to be extended upwardly on lateral extremities of the fifth wheel device to alter the range of motion of the vehicle.

The instant invention is distinguished over the earlier patent and those patents of record at that time (which are incorporated herein by reference) in that a fifth wheel has been provided which includes a slot transverse to the longitudinal axis of the truck and integrally formed with the fifth wheel forward thereof. Below the slot, a pin is carried within a housing on the tractor adapted to be extended without the housing and its slot and placed within a trailer slot so as to provide a constraint should the tractor angulate relative to the trailer beyond the dimension of the trailer slot.

More particularly, a means for preventing jackknifing and enhancing driver control is disclosed hereinafter in which a forward anchor plate portion of the fifth wheel is provided with a slot and allows communication with a housing mounted on a stationary portion of the tractor adjacent the fifth wheel below the slot, the housing including a locking pin capable of extension adapted to pass through the anchor plate slot, the trailor above the anchor plate also having a slot provided thereon. The trailer slot is adapted to receive the locking pin therein for limiting the motion of the fifth wheel of the tractor trailer relative to each other to avoid jackknifing and enhance control. A specific linkage is included for elevating the locking pin which includes first and second bars adapted to rotate in an arcuate path by expansion and contraction of an interconnecting cylinder so as to elevate the locking bar from within the recess of the housing to an upwardly extending position so as to engage the slot of the trailer. Limit switches are associated with axles providing motion to the locking pin so that the range of motion of the tractor trailer can be controlled by the locking pin through these limit switches. A control device is strategically oriented in the driver's cab to allow manual actuation of the device and an indicator is provided to indicate the status of the locking pin during various modes of driving.

OBJECTS AND SUMMARY OF THE INVENTION

Accordingly, this invention has as its primary objective the provision of a new and novel anti-jackknifing and steering enhancement mechanism to be used with tractor trailers.

It is a further object of this invention to provide a device as characterized above which can be readily retrofitted to existing tractor trailers without impairing the maneuverability of the vehicle when so installed.

It is a further object of this invention to provide a device as characterized above which provides an instantaneous warning system to the driver when critical situations are about to occur.

It is a further object of this invention to provide a device as characterized above in which the driver can immediately and readily take appropriate actions based on sensors associated with the device warning of an incipient mishap.

It is a further object of this invention to provide a device as characterized above which is relatively economical, lends itself to mass production techniques, is durable in construction and impervious to road contaminents.

It is a further object of this invention to provide a device as characterized above which provides the driver with sufficient information to know the status of the locking pin and its relationship to a plurality of limit switches, coupled with a speed sensing mechanism so that exit ramps and turns can be negotiated at will, but the device will still provide protection within a range of 10° of travel from a longitudinal centerline during normal highway driving.

These and other objects will be made manifest when considering the following detailed specification when taken in conjunction with the appended drawing figures.

More particularly, there will have been demonstrated an instrumentality for preventing jackknifing associated with a forward portion of the fifth wheel of a tractor trailer combination, in which a housing instrumentality is mounted on a stationary portion of the tractor adjacent the fifth wheel and includes a locking pin capable of extension from without the housing adapted to pass through an anchor plate connected to and integral with the fifth wheel. The trailer includes a slot which is adapted to receive the locking pin therein thereby limiting the motion of the fifth wheel of the trailer relative to the tractor to avoid jackknifing. A specific linkage is included for elevating the locking pin which includes first and second bars adapted to rotate in an arcuate path in response to expansion and contraction of an interconnecting cylinder so as to elevate the locking pin from within the recess of the housing to an upwardly extending position adapted to engage the slot of the trailer. Limit switches, associated with levers are provided with axles that connect to the cylinder through links so that the limit of motion of the locking pin can be controlled by the limit switches. A control device is disposed within the driver's cab to allow manual actuation and an indicator is provided to indicate the status of the locking pin at all times in relation to the speed of the vehicle.

BRIEF DESCRIPTION OF THE DRAWINGS

FIG. 4 is a front view of the housing partially in section and partially in phantom for purposes of clarity.

FIG. 5 is a rear view similar to that which is shown in FIG. 3 with the cylinder in a second position wherein the locking pin is retracted and carried within the housing.

FIG. 6 shows the actuation device for the locking pin carried on the gear shift of the tractor trailer within the cab.

FIG. 7 is a perspective view of an alarm system providing information to the driver at all times.

BRIEF DESCRIPTION OF THE PREFERRED EMBODIMENT

Figure 1:
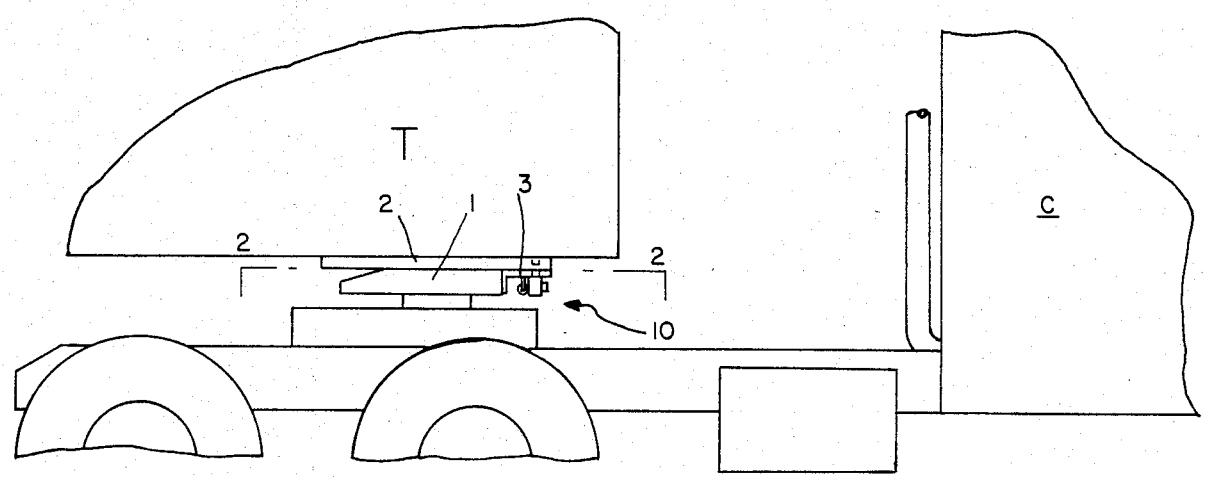
FIG. 1 is a side view of the tractor trailer at the interconnection area of the two.
Figure 2:
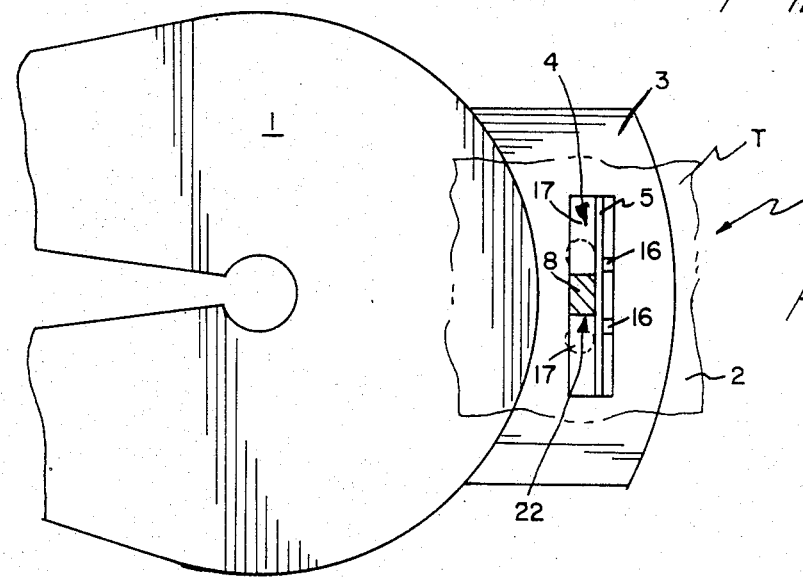
FIG. 2 is a top plan view of the fifth wheel taken along lines 2—2 of FIG. 1.

Refering to the drawings now wherein like reference numerals refer to like parts throughout the various drawing figures, reference numeral 10 is directed to the anti-jackknife and steering control system according to the present invention.

More particularly, the device includes an actuation instrumentality 20 of FIG. 6 preferably attached to the gear shift lever of a truck so as to be readily accessible to the driver and an indicator panel 30 of FIG. 7 which shows the status of the safety device. The anti-jacknife device 10 adjacent the fifth wheel of the tractor trailer at its interconnection area is shown in the remaining drawing figures. Thus, a trailer T attached to the cab C of the tractor at the fifth wheel area includes a plate 2 disposed on a bottom face of the trailer T adapted to be connected to the fifth wheel 1 of a tractor cab C as is well known in the art. However, the plate 2 includes an opening 22 adapted to communicate with a locking pin 8 carried on an anchor plate 3 on the forward edge of the fifth wheel 1 in a manner to be defined.

Figure 3:
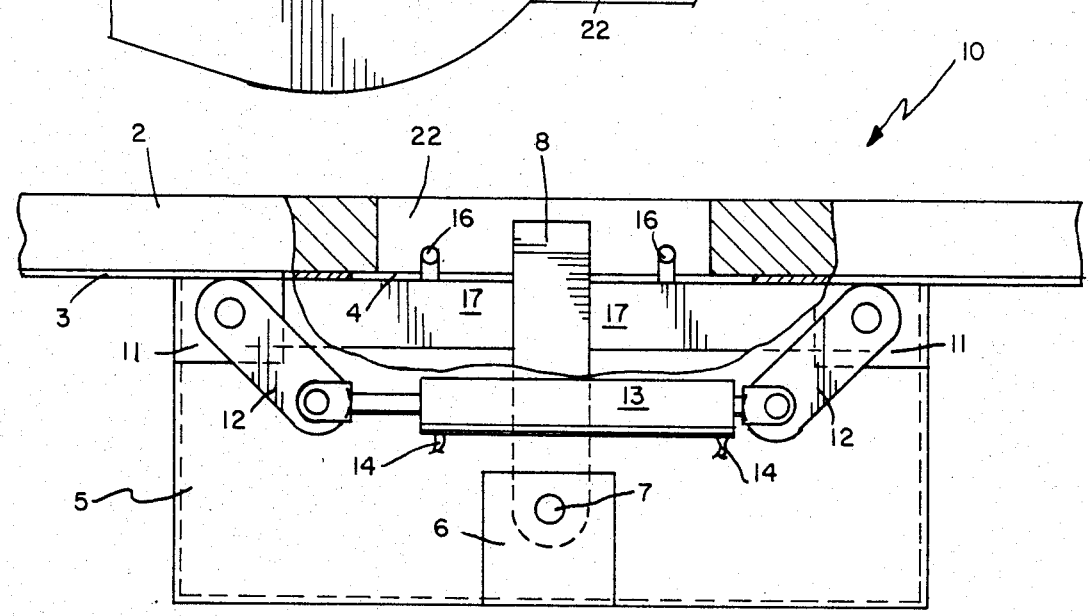
FIG. 3 is a rear view of the housing and pin partially in section to reveal the locking pin in an elevated position.

More particularly, a horizontal leg of the anchor plate 3 is attached to the leading edge of the fifth wheel 1 by means of a vertical leg integrally formed with the horizontal leg to form the anchor plate which has an L-shaped section as shown in FIG. 1 for example. Depending from the anchor plate 3 is a housing box 5 having front and rear walls, side walls and a bottom wall defining a housing, and an opening 4 extending through the anchor plate 3 adapted to communicate with the recess 22 formed on the trailer connecting plate 2 as shown in FIGS. 3, 4 and 5 for example.

Essentially, first and second axles 9 are carried respectively in upper left and right hand corners of the housing 5 by means of axle supports 11 fixed to the housing. The axles 9 run through the housing in the longitudinal direction of the tractor trailer, and a rearward portion of the axles 9 each communicate with links 12 fixed to the axles 9 as by keys (not shown). The actuator links 12 have distal ends remote from the axles which are respectively interconnected by means of a fluidic cylinder 13 which in a preferred form is pneumatically controlled by an onboard pneumatic servo-mechanism commonly found on all tractor trailers. For this purpose, fluidic control lines 14 extend between the fluidic cylinder 13 and the associated fluidic actuator 20 as shown in FIG. 6. The servo-mechanism providing the source of pressurized air is not shown but is interposed along the lines 14. The fluidic control device of FIG. 6 includes a valve body housing 19 and an actuator knob 18 which when moved in the direction of the double headed arrow A allows migration of fluidic pressure allowing same to expand and/or contract the cylinder by appropriate manipulation. More particularly, the knob 18 when in an up position reflects that the locking pin 8 is up and when the knob is in a down position reflects that the locking pin 8 is retracted. Associated indicator lights 21 and 23 respectively delineate the up and down positions. These bulbs may be color coded so that the pin up condition would correspond to an amber bulb being illuminated while the pin down mode would reflect a green light on bulb 23.

In any event, actuation of the fluidic cylinder 13 causes concomitant rotation of the axles 9. Within the housing there is provided first and second bars 17 each fixed to the axles 9 so that axle rotation provides a corresponding rotation of the bars 17. Centrally disposed and extending upwardly from the bottom wall of the housing 5 is a locking pin support 6 which includes a pivot pin 7 fixing the locking pin 8. Rotation of the bars 17 in the direction of the arrows B of FIG. 5 will cause the respective bars 17 to contact opposite sides of the locking pin 8 causing it to move to its upwardly extending position as shown in FIG. 3 for example. At this point, the locking pin 8 is suitably deployed to provide the anti-jackknifing benefits associated with the instant invention. The locking pin 8 in a preferred configuration is formed from rectangular stock which tapers as it extends upwardly from the pivot pin, the taper being somewhat gradual. The rectangular section thereof exhibits excellent wear characteristics as a function of time as well as positive locking within the opening 22 of the connecting plate 2. When the bars 17 are in a relaxed position as shown in FIG. 5, the locking pin 8 is retracted and placed within the housing so that normal function of the tractor trailer for extreme turning angles in city driving, low speed maneuvering and negotiating exit ramps will allow the fifth wheel to operate in a totally conventional and normal manner.

To assure safety and enhance the system, a pair of first and second limit switches are provided on an end of the axles 9 on a front face of the housing. More particularly, the limit switches include first and second limit switch arms 15 which are fixed to the axles 9 and move therewith. FIG. 4 shows the limit switches having sensors 16 extending up with the locking pin into the slot 22 when the locking pin is deployed. The sensors 16 communicate with a signal control system 30 to indicate when the maximum limit of travel is almost reached; that is, when the clearance of the slot 22 in relationship to the locking pin 8 will cause abutment between one or the other of the sensors 16 and the locking pin 8 as it moves toward one or the other of the end walls defined by the slot 22. More particularly, each of the sensors 16 when in the upright position of FIG. 4 will sense the presence of the locking pin 8 at respective positions near one or the other of the end walls end walls defining limits of the opening 22 and still allow the vehicle operator of steering clearance prior to having the locking pin 8 coming into contact with one or the other end walls of the slot 22 and serve as a constraint against the end walls of the opening 22. For this purpose, the limit switches communicate with suitable conductors 27 to provide a display on the console 30.

The indicator box 30 of FIG. 7 provides a housing 32 substantially triangular in section having a rectangular front face provided with a peripheral sun shade lip on three sides thereof for clear viewing of the panel lights in the daytime. A first light 31 is an amber light corresponding to amber light 21 indicating that the locking pin 8 is up. The second light 33 corresponds to the light 23 and is a green indicator that the pin is down. The light 34 is a flashing red light to indicate that the locking pin is close to abutment with the walls of the opening 22, and reflects the signal from the limit switches 15.

This may be accompanied by an audible alarm in the form of a beeper 35 and a further amber signal 36 can be coupled with the beeper 35, the amber signal adapted to flash in combination with the beeper to indicate that the pin is up and the vehicle has slowed to less than 30 MPH which is indicative of the vehicle's presence in town, on an exit ramp on the highway, or alternatively maneuvering in a parking lot.

Having thus described the preferred embodiment of the invention, it should be understood that numerous structural modifications and adaptations may be resorted to without departing from the spirit of the invention. For example, the device could include a shroud or housing overlying the housing 5 to completely seal the device and render it impervious to elements. For the sake of simplicity, the sensor associated with the 30 MPH indicator has not been shown but is believed to be within the genre of commercially available entities.

What is claimed is:

1. In a tractor including a cab and an associated trailer, an anti-jackknife and steering control system therefore comprising, in combination:
   a tractor fifth wheel and an anchor plate integrally fastened thereto;
   locking means connected to and extending forward of said tractor fifth wheel and including a locking pin;
   lock receiving means overlying said locking means and carried on a bottom portion of the trailer, said locking pin being positionable within said lock receiving means;
   actuating means within a cab of the tractor for actuating said locking means from a driver's position;
   indicating means within the cab for indicating both deployment of said locking means and attainment of a predetermined travel limit of said locking means, said indicating means including first and second sensors denoting relative travel between the tractor and the trailer;
   a servo-mechanism; and
   wherein said locking means includes a housing precluding contamination from environment, said housing being disposed on the anchor plate integrally fastened to the fifth wheel and having a top opening allowing motion of said locking pin from a first stored position to a second deployed position within said lock receiving means;
   wherein said lock receiving means is formed as a connecting plate disposed on a bottom face of the trailer adjacent a leading edge thereof, said connecting plate being provided with an opening operatively arranged to receive therewith said locking means;
   wherein said actuating means includes a fluidic control valve operatively arranged to direct fluid from said servo-mechanism to said locking means; and
   wherein said locking means is formed from said housing which has front and rear walls, side walls and a bottom wall depending from said anchor plate, said anchor plate being of substantially L-shaped section fastened to a forward edge of said fifth wheel, an opening though said anchor plate allowing communication of said locking means, said locking means being carried within said housing and including first and second axles disposed within upper right-hand and left-hand corners of said housing, first and second bars fixed to said axles whereby rotation of said axles causes concomitant rotation of said bars, said locking pin being pivoted to said bottom wall of said housing and operatively positioned to abut against said bars whereby rotation of said shaft and said bars causes deployment of said locking pin into said opening in said connecting plate; and
   further comprising fluidic actuating means carried on a rearward face of said housing;
   first and second links extending from said fluidic actuating means to said axles whereby expansion and contraction of said fluidic actuator means rotate said axles; and
   first and second limit switches connected to said axles on a front outer face of said housing whereby rotation of said axles causes deployment of said limit switches on either side of and spaced from said locking pin;
   whereby unexpected loss of control of the tractor trailer common in jackknifing situations is automatically controlled yet maneuverability of the tractor trailer for non-emergency maneuvering has been maintained.

2. The system of claim 1, wherein said means for actuating said locking pin includes an air valve disposed on a gear shift lever contained within the driver's cab, a valve button having first and second positions directing flow of fluidic pressure to said fluidic actuating means, a supplemental indicator means on said knob indicating whether said locking pin is in a deployed or a retracted position; and wherein said indicator means comprises a plurality of indicator lights and a housing of substantially triangular shape in section having a sun shade on a face thereof adapted to preclude admission of sunlight so that the indicator lights can be visible during the daylight, the plurality of indicator lights comprising, a first indicator light indicating the deployed condition, a second indicator light indicating the retracted position, a third indicator light indicating a deployed condition when jackknifing is imminent and a fourth indicator light responsive to the system being on but at low speed, and an audible alarm associated with at least one of said indicator lights.

3. A device to control the relationship between a tractor and its associated trailer having a longitudinal axis, comprising, in combination:
   a fifth wheel;
   first and second openings forward an area where the tractor meets the trailer;
   a locking pin;
   a housing, said locking pin being movably disposed within said housing;
   means on said tractor to allow said locking pin to be placed through said openings, one said opening being on the trailer and the other of the openings being on the tractor;
   wherein said locking pin is provided within a housing having said second opening on said tractor, the housing having front and rear walls, a bottom and two side walls defining an interior within which said locking pin is placed when not in use;
   means for extending said locking pin from a retracted position within said housing to an extended position, said housing being disposed on a leading portion of said fifth wheel and said means for extending said locking means including first and second axles provided within said housing and extending in a direction parallel to the longitudinal axis of the tractor and its associated trailer and a pair of linkage bars each connected to one of said axles and fixed thereto; and means for rotating said axles whereby rotation of said axles moves said linkage bars and causes said locking pin to move from a retracted to an extended position;

whereby articulation of said tractor and trailer is reflected by relative motion of the two openings, and said locking pin provides a constraint to limit the amount of motion based on the dimension of the openings.

4. The device of claim 3, including a supporting block attached to said bottom wall of said housing; and wherein said locking pin is supported within said housing by means of a pivot on an end of said locking pin, said pivot being attached to said supporting block on said bottom wall of said housing.

5. The device of claim 4, wherein each said axle is provided with connecting links on a back face exterior of said housing, an extensible air cylinder connecting said links, and means for causing said cylinder to move from a retracted to an expanded position thereby rotating said axles.

6. The device of claim 5, wherein said axles include on a front portion exterior of said housing, first and second limit switches operatively positioned and arranged to rotate with said axles, said limit switches sensing imminent contact of a wall of that one of said openings which is on said trailer with said locking pin.

7. The device of claim 6, wherein said limit switches are connected to a visual display within the cab of the tractor for denoting when said limit switches contacts said wall of said opening which is on said trailer.

8. The device of claim 7, wherein said air cylinder is operatively positioned and arranged to be moved from its expanded to its retracted position by means of an actuating valve contained within the cab and a source of air pressure in series thereto to provide motive force for the air cylinder.

9. An instrumentality for controlling the articulation between two horizontal rotatable members comprising in combination:

an upwardly extending member on one of said rotating members;

a recess on the other one of said rotatable members operatively positioned and arranged to receive said upwardly extending member therein;

limit determining means for determining when a limit of travel between said two rotatable members is near; and means for removing said upwardly extending member from said recess;

a block, said upwardly extending member being pivotably supported by said block;

means for moving said upwardly extending member from a stored to a deployed condition; and means for simultaneously deploying said upwardly extending member and said limit determining means.

10. The device of claim 9, including audible and visual means associated with said limit determining means to indicate when said upwardly extending member is proximate to a surrounding wall of said recess.

11. The device of claim 9, including bars, and a remote control; wherein said means for simultaneously deploying includes first and second axles operatively arranged to rotate said bars which actuate said upwardly extending member and said limit determining means, and a pneumatic cylinder associated therewith to cause rotation of said axles, said pneumatic cylinder being operatively arranged to be extended or retracted by said remote control.

12. In a tractor including a cab and an associated trailer, an anti-jackknife and steering control system therefore comprising in combination:

a tractor fifth wheel and an anchor plate integrally fastened thereto;

locking means connected to and extending forward of said tractor fifth wheel and including a locking pin;

lock receiving means overlying said locking means and carried on a bottom portion of the trailer, said locking means being within said lock receiving means;

actuating means within a cab of the tractor for actuating said locking means from a driver's position;

wherein said locking means includes a housing precluding contamination from environment, said housing being disposed on the anchor plate integrally fastened to the fifth wheel and having a top opening allowing motion of said locking pin from a first stored position to a second deployed position within said lock receiving means;

wherein said lock receiving means is formed as a connecting plate disposed on a bottom face of the trailer adjacent a leading edge thereof, said connecting plate being provided with an opening operatively arranged to receive said locking means;

wherein said actuating means includes a fluidic control valve operatively arranged to direct fluid to said locking means;

wherein said locking means is formed from said housing which has front and rear walls, side walls and a bottom wall depending from said anchor plate, said anchor plate being of substantially L-shaped section fastened to a forward edge of said fifth wheel, the opening though said anchor plate allowing communication of said locking means with said lock receiving means, said locking means being carried within said housing and including first and second axles disposed within upper right-hand and left-hand corners of said housing, first and second bars fixed to said axles whereby rotation of said axles causes concomitant rotation of said bars, said locking pin being pivoted to said bottom wall of said housing and operatively positioned to abut against said bars whereby rotation of said shaft and said bars causes deployment of said locking pin into said opening; and further comprising fluidic actuating means carried on a rearward face of said housing;

first and second links extending from said fluidic actuating means to said axles whereby expansion and contraction of said fluidic actuator means rotate said axles; and first and second limit switches connected to said axles on a front outer face of said housing whereby rotation of said axles causes deployment of said limit switches on either side of said locking pin;

whereby unexpected loss of control of the tractor trailer common in jackknifing situations is automatically controlled yet maneuverability of the tractor trailer for non-emergency maneuvering has been maintained.

13. The device of claim 12, including a supporting block fixed on said bottom wall of said housing; and wherein said locking pin is supported within said housing by means of a pivot on an end of said locking pin attached to said supporting block.

14. The device of claim 12, wherein each said axle is provided with connecting links on a back face exterior of said housing, an extensible air cylinder connecting said links, and means for causing said cylinder to move from a retracted to an expanded position thereby rotating said axles.

15. The device of claim 14, wherein said air cylinder is operatively arranged to be moved from its expanded to its retracted position by means of an actuating valve contained within the cab and a source of air pressure in series with said actuating valve to provide motive force for the air cylinder.

16. The device of claim 12, wherein said axles include on a front portion exterior of said housing, first and second limit switches operatively arranged to rotate with said axles, said limit switches sensing imminent contact of a wall of said opening coming into contact with said locking pin.

* * * * *